(12) United States Patent
Pourdeyhimi

(10) Patent No.: US 10,464,000 B2
(45) Date of Patent: Nov. 5, 2019

(54) ELASTOMERIC DEPTH FILTER

(71) Applicant: North Carolina State University, Raleigh, NC (US)

(72) Inventor: Behnam Pourdeyhimi, Cary, NC (US)

(73) Assignee: North Carolina State University, Raleigh, NC (US)

( * ) Notice: Subject to any disclaimer, the term of this patent is extended or adjusted under 35 U.S.C. 154(b) by 811 days.

(21) Appl. No.: 14/370,302

(22) PCT Filed: Jan. 4, 2013

(86) PCT No.: PCT/US2013/020220
§ 371 (c)(1),
(2) Date: Jul. 2, 2014

(87) PCT Pub. No.: WO2013/103765
PCT Pub. Date: Jul. 11, 2013

(65) Prior Publication Data
US 2014/0332476 A1      Nov. 13, 2014

Related U.S. Application Data

(60) Provisional application No. 61/583,157, filed on Jan. 4, 2012.

(51) Int. Cl.
*B01D 39/14* (2006.01)
*B32B 37/02* (2006.01)
(Continued)

(52) U.S. Cl.
CPC .......... *B01D 39/14* (2013.01); *B01D 39/083* (2013.01); *B01D 39/1623* (2013.01);
(Continued)

(58) Field of Classification Search
CPC .. B01D 39/14; B01D 39/083; B01D 39/1623; B01D 2239/0622; B01D 2239/0627;
(Continued)

(56) References Cited

U.S. PATENT DOCUMENTS

| | | |
|---|---|---|
| 3,338,992 A | 8/1967 | Kinney |
| 3,341,394 A | 9/1967 | Kinney |

(Continued)

FOREIGN PATENT DOCUMENTS

| | | |
|---|---|---|
| CN | 2063439 | 10/1990 |
| CN | 200945262 | 9/2007 |

(Continued)

*Primary Examiner* — Allison G Fitzsimmons
(74) *Attorney, Agent, or Firm* — Womble Bond Dickinson (US) LLP

(57) ABSTRACT

The present disclosure provides a depth filter medium comprising at least one elastomeric nonwoven web strengthened by combination with one or more structural support layers. The resulting material is particularly useful in the field of filtration, wherein particulates captured within the elastomeric nonwoven web can be readily released, such as by applying pressure to the web through backwashing. The elastomeric nonwoven web advantageously can stretch under such pressure and return substantially to its original structure and shape upon the removal of the pressure, rendering the filter available for reuse.

25 Claims, 5 Drawing Sheets

(51) Int. Cl.
*B01D 39/16* (2006.01)
*B32B 37/12* (2006.01)
*B32B 37/22* (2006.01)
*B01D 39/08* (2006.01)

(52) U.S. Cl.
CPC .......... *B32B 37/02* (2013.01); *B32B 37/1292* (2013.01); *B32B 37/223* (2013.01); *B01D 2239/0622* (2013.01); *B01D 2239/0627* (2013.01); *B01D 2239/0654* (2013.01); *B01D 2239/0663* (2013.01); *B01D 2239/0668* (2013.01); *B01D 2239/0681* (2013.01); *B01D 2239/1216* (2013.01); *B32B 2305/026* (2013.01); *B32B 2307/726* (2013.01); *B32B 2310/028* (2013.01); *B32B 2323/00* (2013.01); *Y10T 156/10* (2015.01)

(58) Field of Classification Search
CPC .... B01D 2239/0654; B01D 2239/0663; B01D 2239/0668; B01D 2239/0681; B01D 2239/1216; B32B 37/02; B32B 37/1292; B32B 37/223; B32B 2305/026; B32B 2305/726; B32B 2305/028; B32B 2305/00; Y10T 156/10
USPC .................................................. 210/503, 508
See application file for complete search history.

(56) References Cited

U.S. PATENT DOCUMENTS

| | | | |
|---|---|---|---|
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 4,041,203 A * | 8/1977 | Brock | B32B 5/08 156/291 |
| 4,302,495 A * | 11/1981 | Marra | B32B 5/12 428/110 |
| 4,340,563 A | 7/1982 | Appel et al. | |
| 4,612,228 A | 9/1986 | Kato et al. | |
| 5,035,240 A | 7/1991 | Braun et al. | |
| 5,540,976 A | 7/1996 | Shawyer et al. | |
| 5,597,645 A * | 1/1997 | Pike | B01D 39/1623 210/243 |
| 5,964,973 A | 10/1999 | Heath et al. | |
| 7,695,624 B2 | 4/2010 | Brockmann et al. | |
| 7,883,772 B2 | 2/2011 | Pourdeyhimi et al. | |
| 7,972,508 B2 | 7/2011 | Danielsson et al. | |
| 7,981,226 B2 | 7/2011 | Pourdeyhimi et al. | |
| 9,050,563 B2 | 6/2015 | Inoue | |
| 2003/0203696 A1 | 10/2003 | Healey | |
| 2004/0132373 A1 | 7/2004 | Müller et al. | |
| 2008/0276805 A1 * | 11/2008 | Lotgerink-Bruinenberg | B01D 39/1623 96/75 |
| 2010/0025892 A1 | 2/2010 | Jones et al. | |
| 2010/0029161 A1 | 2/2010 | Pourdeyhimi | |
| 2010/0291213 A1 * | 11/2010 | Berrigan | D04H 1/42 424/484 |
| 2011/0064928 A1 | 3/2011 | Bonneh | |
| 2011/0180487 A1 | 7/2011 | Manic et al. | |
| 2011/0256791 A1 | 10/2011 | Seidel et al. | |

FOREIGN PATENT DOCUMENTS

| | | |
|---|---|---|
| CN | 201171941 | 12/2008 |
| CN | 102166457 | 8/2011 |
| CN | 201997186 | 10/2011 |
| EP | 2 006 008 | 12/2008 |
| JP | 2009112887 | 5/2009 |
| WO | WO 2010/107503 | 9/2010 |

* cited by examiner

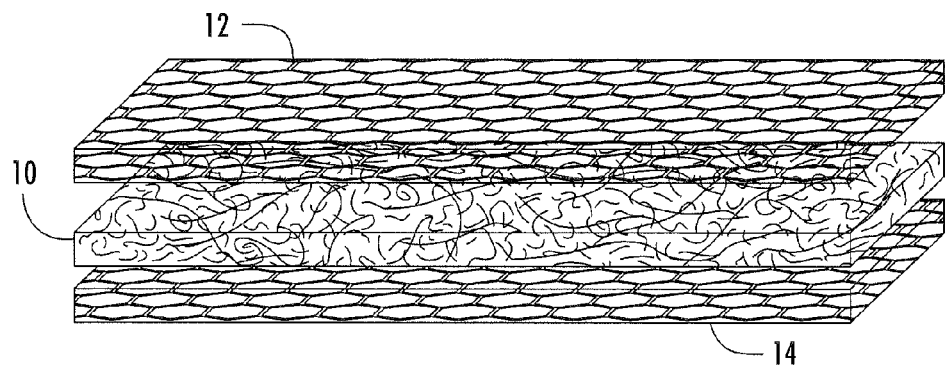
FIG. 3
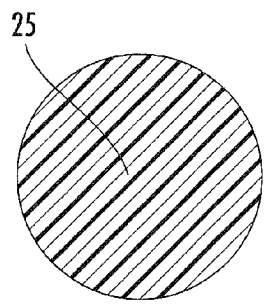 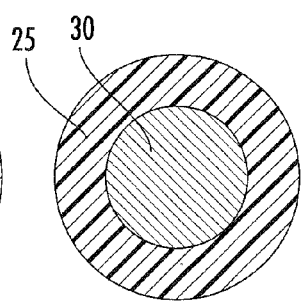 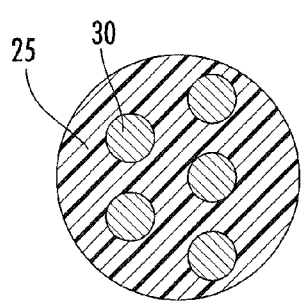
FIG. 4A　　　　　FIG. 4B　　　　　FIG. 4C
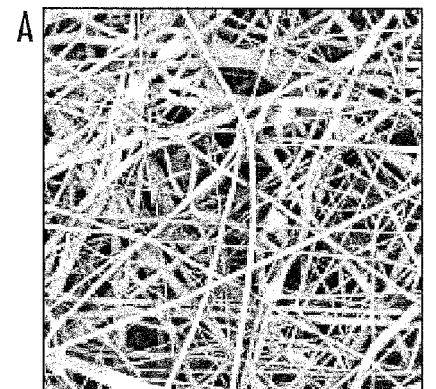 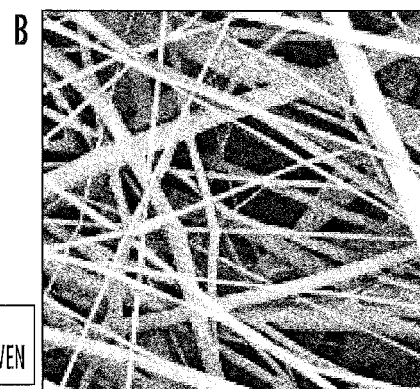
FIG. 5

ELASTOMERIC DEPTH FILTER

CROSS-REFERENCE TO RELATED APPLICATIONS

The present application is a national stage entry of PCT International Application No. PCT/US2013/020220, filed Jan. 4, 2013, which claims the benefit of U.S. Provisional Application No. 61/583,157, filed Jan. 4, 2012. Both of these applications are incorporated by reference herein in their entireties.

FIELD OF THE INVENTION

The present invention relates generally to filters comprising a nonwoven component that exhibits some degree of elasticity.

BACKGROUND OF THE INVENTION

Filters for water filtration and, in particular, waste water filtration, typically comprise woven structures where filaments are precisely spaced in the warp and weft (i.e., lengthwise/machine direction and crosswise/widthwise direction), forming essentially a single layer sieve with a precise pore geometry. These structures are typically made from filaments that are at least 20 to 100 microns or more in diameter, depending on the degree of openness required and the final pore size desired. The pore size of such structures is controlled by the spacing of the filaments in the machine and cross directions. Due to the uniformity of the construction of these types of filters, the filters are rated based upon the size of the fixed pores. Such materials act as surface filters, retaining particulates on the surface of the filter and not deep within the structure. Particles larger than the pore size are retained on the surface of the filter and particles smaller than the pore size pass through. For example, a "20 micron filter" will retain particles that are 20 microns or larger in diameter, while smaller particles will pass through. Common filters are "20 micron filters," "10 micron filters," "5 micron filters," and "1 micron filters," capable of retaining particles having diameters of 20 microns or more, 10 microns or more, 5 microns or more, and 1 micron or more, respectively.

As these woven structures are surface filters, the pores often become fouled with retained particulates during use. When a surface filter has become fouled, the surface must be cleaned to remove the collected particulates and render the filter ready for reuse. For example, the surface filter can be backwashed using water jet spays to release the retained particulates. Sometimes, the backwashing is followed by a chemical wash to remove deposition of other matter on the surface of the woven filter, such as proteins and other substances present in the liquid stream that are deposited on the filter surface.

In contrast to woven surface filters, nonwoven fabrics typically do not have precise pore geometries and sizes and commonly comprise a range of pore capillaries throughout the structure. The pores of a nonwoven material are not planar and create a tortuous path within the material that can allow particulates to be effectively retained within the structure (via depth, rather than surface, filtration). Accordingly, depth filters generally provide for longer term use, as depth filters often can retain larger quantities of particulate matter than surface filters. However, the tortuous paths within nonwoven materials, and the usual lack of dimensional stability of nonwoven materials, render it difficult to remove retained particulates captured within nonwoven depth filters. Nonwoven filters are thus typically used in applications where the pore size requirements are larger, such as in swimming pool and spa filters. Generally, such filters are replaced upon fouling and/or reduction in capture efficiency, rather than being cleaned for reuse.

It would be desirable to provide a filter material combining the advantages of surface filtration (e.g., ease of cleaning and dimensional strength) with the advantages of depth filtration (e.g., longer-term use).

SUMMARY OF THE INVENTION

The present invention provides a filter medium comprising an elastomeric nonwoven web. The elastomeric nonwoven web is generally laminated to, or otherwise attached to, one or more structural support layers. Advantageously, the elastomeric nonwoven web can exhibit depth filtration capabilities and also has sufficient flexibility to allow the web to be backwashed to remove captured particulates, such that the nonwoven web can be reused for filtration.

In one aspect of the invention is provided a depth filter medium comprising: a first structural support layer comprising a first porous material; and an elastomeric nonwoven web attached to the first structural support layer, wherein the elastomeric nonwoven web comprises elastomeric fibers and has a mean flow pore size of about 15 microns or less; and wherein said first structural support layer has a mean flow pore size greater than the mean flow pore size of the elastomeric nonwoven web. In certain embodiments, the depth filter medium can further comprise a second structural support layer comprising a second porous material having a mean flow pore size greater than the mean flow pore size of the elastomeric nonwoven web, said elastomeric nonwoven web being positioned between said first and second structural support layers. In some embodiments, the second porous material may have a mean flow pore size smaller than the mean flow pore size of the first porous material.

The elastomeric fibers can, in some embodiments, be meltblown or spunbonded fibers. In some embodiments, the elastomeric fibers may comprise block copolymers. One specific example of a useful elastomer is a propylene-based elastomer. In addition to the elastomeric fibers, one or more additional (non-elastomeric) fibers may be incorporated in the elastomeric nonwoven web. In some embodiments, the elastomeric nonwoven web has a mean flow pore size of less than about 10 microns or less than about 5 microns.

In certain embodiments, the elastomeric nonwoven web comprises two or more elastomeric nonwoven sheets laminated together. Exemplary elastomeric nonwoven webs have a basis weight of about 500 g/m$^2$ or less or about 200 g/m$^2$ or less.

Any of the structural support layers may be, for example, a woven material or a mesh having a uniform pore size. In some embodiments, the mean flow pore size of either structural support layer is about thirty microns or less.

In one particular embodiment, the invention provides a depth filter material comprising a first structural support layer that includes a woven material or a mesh having a mean flow pore size of about 30 microns or less, and an elastomeric nonwoven web comprising a single layer of elastomeric nonwoven material or a laminate of multiple layers of elastomeric nonwoven material, the elastomeric nonwoven web having a mean flow pore size of about 10 microns or less and a basis weight of about 200 g/m$^2$ or less.

In another aspect of the invention is provided a depth filter, comprising a depth filter medium according to any of the embodiments noted herein and a structural frame attached to the depth filter medium. The depth filter can be, for example, adapted for water filtration.

In a further aspect of the invention is provided a method of making an elastomeric depth filter medium, comprising: providing an elastomeric nonwoven web comprising elastomeric fibers and having a mean flow pore size of about 15 microns or less; and attaching the elastomeric nonwoven web to a first structural support layer to form a depth filter medium, wherein said first structural support layer is a porous material with a mean flow pore size greater than the mean flow pore size of the elastomeric nonwoven web. According to this method, the providing step may, in certain embodiments, comprise meltblowing or spunbonding fibers. In some embodiments, the attaching step comprises stitching, chemically bonding, thermally bonding, ultrasonic bonding, print adhesive bonding, applying pressure, hydroentangling, or a combination thereof The method may further include attaching a second structural support layer to the elastomeric nonwoven web on a side opposite from the first structural support layer, the second structural support layer comprising a second porous material having a mean flow pore size greater than the mean flow pore size of the elastomeric nonwoven web. In a further embodiment, the method includes laminating two or more layers of elastomeric nonwoven material together to form the elastomeric nonwoven web. The method may also include attaching a structural frame to the depth filter medium.

In a still further aspect of the present invention is provided a method of filtering a liquid to remove particulate matter therefrom comprising: contacting a liquid comprising particulate matter with a depth filter medium according to any embodiment described herein to remove at least a portion of the particulate matter from the liquid by depth filtration or a combination of depth filtration and surface filtration. The method can, in certain embodiments, further comprise backwashing the depth filter medium such that at least a portion of the particulate matter in the depth filter medium is removed from the depth filter medium, allowing for its reuse in filtration. In embodiments where the depth filter medium includes a second structural support layer comprising a second porous material having a mean flow pore size greater than the mean flow pore size of the elastomeric nonwoven web and a mean flow pore size smaller than the mean flow pore size of the first porous material, wherein the elastomeric nonwoven web is positioned between said first and second structural support layers, the liquid is advantageously contacted with the depth filter medium such that the first structural support layer is upstream and the second structural support layer is downstream during use.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 3 is an exploded perspective view of another embodiment of an elastomeric filter medium according to the present invention, comprising an elastomeric nonwoven web sandwiched between two structural support layers;

FIGS. 4A, 4B, and 4C are illustrations of three exemplary fiber cross-sections of fibers that can be used in certain embodiments of the invention;

FIGS. 5A and 5B are scanning electron microscope (SEM) images of a nonwoven elastic meltblown web with a basis weight of 60 g/m$^2$ at two magnifications (A=395× magnification and B=1000× magnification);

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Directional terms, such as "forward," "rearward," "front," "back," "right," "left," "upwardly," "downwardly," and the like are words of convenience and are not to be construed as limiting terms.

The invention generally provides an elastomeric nonwoven web comprising at least one elastomeric component. In certain embodiments, the elastomeric nonwoven web is strengthened by combining it with one or more structural support layers. Advantageously, the structural support layer (s) can, in some embodiments, serve to protect the fibers of the elastomeric nonwoven web from breakage and/or limit the extension of the elastomeric nonwoven web. These supported elastomeric webs, in certain embodiments, are particularly applicable in the field of filtration, wherein particulates captured within the web can readily be released (e.g., by applying pressure to the web). The elastomeric fibers advantageously can stretch under such pressure and return substantially to their originally structure and shape upon the removal of the pressure, rendering the filter available for reuse.

Advantageously, in certain embodiments, supported elastomeric nonwoven webs prepared according to the methods described herein can exhibit enhanced filtration characteristics as compared with woven fabric materials traditionally used in filtration. FIGS. 1A and 1B provide scanning emission microscopy (SEM) images (at different magnifications) of an exemplary conventional woven fabric used for wastewater treatment, with a mean pore size of ten microns. The fibers of this conventional woven fabric are arranged in a uniform pattern, defining uniform pore sizes throughout the exposed surface, where the pore sizes are defined by the fiber diameter and the weaving pattern. The woven fabric has a generally flat pore structure and particles are collected by a sieving mechanism on the surface of the filter medium (i.e., by surface filtration).

Figure 2:
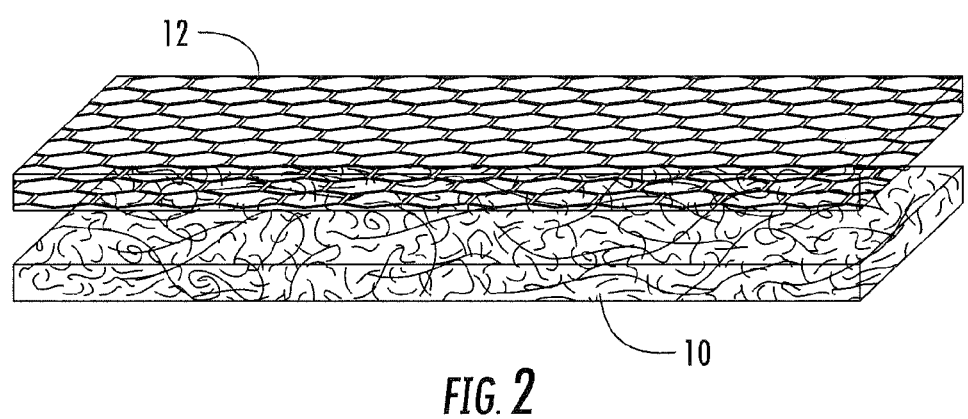
FIG. 2 is an exploded perspective view of an embodiment of an elastomeric filter medium according to the present invention, comprising an elastomeric nonwoven web and one structural support layer.

In contrast, the elastomeric nonwoven webs described herein, in some embodiments, can exhibit a combination of surface and depth filtration. In certain embodiments, at least some percentage of particles brought into contact with the elastomeric nonwoven web are captured by depth filtration mechanisms within the tortuous paths established within the web. Representative schematics of two exemplary embodiments of the invention are provided in FIGS. 2 and 3. FIG. 2 illustrates a material comprising an elastomeric nonwoven web 10 and a structural support layer 12. FIG. 2 illustrates a material comprising an elastomeric nonwoven web 10, a first structural support layer 12, and a second structural support layer 14. These components will be more fully described hereinafter.

The makeup of the elastomeric nonwoven webs provided according to the present disclosure can vary. For example, in some embodiments, the elastomeric nonwoven web consists essentially of, or entirely of, elastomeric fibers. In some embodiments, the nonwoven web comprises at least one elastomeric fiber type and at least one non-elastomeric fiber type, where the ratio of elastomeric to non-elastomeric fiber type can vary. The percentage of elastomeric fiber type in the nonwoven web in such embodiments is generally that amount necessary to provide some degree of elasticity to the web.

"Elastomer" and "elastomeric component," as used herein, refer to any polymer that exhibits a degree of elasticity (e.g., capable of returning substantially to its original shape or form after being subjected to stretching or deformation). A nonwoven web according to the invention that includes an elastomeric component should exhibit sufficient elasticity to enable the nonwoven web to function as a depth filtration medium and to allow recovery of sufficient filtration capacity of the web upon washing to enable reuse of the filtration medium.

In certain embodiments, the elasticity of the elastomeric web can be characterized by the elongation to break of the elastomeric web. For example, representative embodiments of the elastomeric nonwoven web of the invention exhibit elongation to break of at least about 80%, at least about 90%, at least about 100%, at least about 120%, at least about 150%, at least about 200%, or even at least about 250%. A representative range of elongation to break is about 80% to about 300%. Elongation to break can be measured, for example, by following ASTM D5034 and using a tensile testing machine, such as those manufactured by Instron. Another method for measuring elongation to break is to test biaxial stretch and recovery, for example, using a Truburst Strength Tester manufactured by James Heal™.

Although not limited, the elastomers used in the present disclosure typically are thermoplastic elastomers (TPEs), which generally exhibit some degree of elasticity and can be processed via thermoplastic processing methods (e.g., can be easily reprocessed and remolded). Thermoplastic elastomers can comprise both crystalline (i.e., "hard") and amorphous (i.e., "soft") domains and often comprise a blend or copolymer of two or more polymer types. Where the thermoplastic elastomer comprises a copolymer, it may be prepared, for example, by block or graft polymerization techniques. Thermoplastic elastomeric copolymers can, for example, comprise a thermoplastic component and an elastomeric component. In certain copolymeric thermoplastic elastomers, the physical properties of the material can be controlled by varying the ratio of the monomers and/or the lengths of the segments.

Certain exemplary thermoplastic elastomers can be classified as styrenic elastomers (e.g., styrene block copolymers), copolyester elastomers, polyurethane elastomers, polyamide elastomers, polyolefin blends (TPOs), polyolefins (alloys, plastomers, and elastomers), and thermoplastic vulcanizates. Certain specific elastomers that are useful according to the present invention include, for example, polyisoprene, butadiene rubber, styrene-butadiene rubber, poly(styrene-b-butadiene-b-styrene) (SBS), poly(styrene-b-ethene-co-butane-b-styrene) (SEBS), poly(styrene-b-isoprene-b-styrene), ethylene propylene diene monomer rubber (EPDM rubber), EPDM rubber/polypropylene (EPDM/PP), polychloroprene, acrylonitrile-butadiene rubber, hydrogenated nitrile rubber, butyl rubber, ethylene-propylene rubber (EPM), silicone rubber, chlorosulfonated polyethylene, polyacrylate rubber, fluorocarbon rubber, chlorinated polyethylene rubber, epichlorohydrin rubber, ethylene-vinylacetate copolymer, styrene-isoprene block copolymer, urethane rubber, and copolymers, blends, and derivatives thereof.

Exemplary commercially available thermoplastic elastomers include, but are not limited to: OnFlex™, Versaflex™, Dynaflex™, Dynalloy™, Versalloy™, and Versollan™ from PolyOne™ Corporation (Avon Lake, Ohio); RTP 1200, 1500, 2700, 2800, 2900, and 6000 Series Elastomers from RTP Company (Winona, Minn.); Elastocon 2800, 8000, STK, SMR, CLR, and OF Series TPEs from Elastocon (Rochester, Ill.); Enflex® and Ensoft® from Enplast (Turkey); Styroflex® SBS, Elastollan®, and Elasturan® from BASF (Florham Park, N.J.); Kraton MD6705, G1643, MD6717, MD6705, G1643 (Kraton Performance Polymers, Inc., Houston, Tex.); Affinity™, Amplify™, Engage™, Infuse™, Nordel™, and Versify™ from Dow Chemical (Midland, Mich.); Vistamaxx™, Santoprene™, and Exact™ from ExxonMobil Chemical Company (Houston, Tex.); Kalrez®, Neoprene, Surlyn®, Vamac®, and Viton® from DuPont® Chemicals (Wilmington, Del.); Pebax® from Arkema (France); Mediprene® and Dryflex® from Elasto (Sweden); Estagrip® and Estane® from Lubrizol Corporation (Wickliffe, Ohio); Geraflex™, Garathane™, Vythrene™, and Evoprene™ from AlphaGary (Leominster, Mass.) and Santoprene® from Advanced Elastomer Systems (Newport, Calif.). Other exemplary elastomeric materials are described, for example, in U.S. Patent Application Publication No. 2010/0029161 to Pourdeyhimi, which is incorporated herein by reference; see also, U.S. Pat. No. 5,540,976 to Shawver et al., which is incorporated herein by reference.

The fibers comprising the elastic nonwoven web can have any type of cross-section, including, but not limited to, circular, rectangular, square, oval, triangular, and multilobal. The fibers may, in some embodiments, be single-component (i.e., uniform in composition throughout the fiber). A single-component fiber cross-section having a circular cross section is illustrated in FIG. 4A, with a uniform composition, 25. In certain embodiments, the fibers can have one or more void spaces, wherein the void spaces can have, for example, circular, rectangular, square, oval, triangular, or multilobal cross-sections. In some embodiment, the fibers comprising the elastic nonwoven web can be multi-component fibers. Multi-component fiber types include, but are not limited to, fibers having a sheath/core cross-sectional structure as depicted in FIG. 4B (wherein the sheath comprises one composition, 25, and the core comprises a different composition, 30) and fibers having an islands-in-the-sea cross-sectional structure as depicted in FIG. 4C (wherein the sea comprises one composition, 25, and any number of islands, having a different composition 30, can be present within the sea component), as well as fibers having a side-by-side, segmented pie, segmented cross, segmented ribbon, or tipped multilobal cross-section. In some embodiments, the fibers have a cross-section with a middle region, wherein the middle region has a plurality of projections extending from the middle region and along the periphery of the middle region and wherein the plurality of projections defines a plurality of uniformly spaced channels.

In multi-component fibers useful according to certain embodiments of the invention, one or more components of the fiber can comprise an elastomeric component. For example, in some embodiments, a sheath/core fiber can be used, wherein the sheath, core, or both the sheath and the core comprise an elastomeric polymer. In certain embodiments, one or more components of a multi-component fiber is a sacrificial component that can be removed (e.g., dissolved) if desired. For example, in one embodiment, an islands-in-the-sea fiber is used wherein the sea is dissolvable, such that fibers or fibrils of smaller diameter (i.e., the islands) are produced after treatment of the multi-component fibers with an appropriate solvent, the islands typically comprising the elastomeric component. In certain embodiments, two or more components of a multi-component fiber can be separated from each other (e.g., by fibrillation or splitting). For example, in one embodiment, an islands-in-the-sea fiber is used wherein the fiber can be fibrillated to separate the islands and sea component. See, for example, U.S. Pat. Nos. 7,883,772 and 7,981,226, both to Pourdeyhimi et al., which are incorporated by reference herein.

Advantageously, the fibers forming the elastomeric nonwoven web have an average diameter of less than about 20 microns, less than about 10 microns, less than about 8 microns, less than about 5 microns, or less than about 2 microns. In certain embodiments, the elastomeric fibers have a diameter in the range from about 2 to about 20 microns, about 2 microns to about 10 microns, about 2 to about 8 microns, or about 2 to about 5 microns. In other embodiments, the elastomeric filaments have a diameter in the range from about 0.5 microns to about 10 microns, e.g., from about 0.5 microns to about 5 microns or from about 0.5 microns to about 2 microns. The fibers comprising the nonwoven web can have varying lengths and may be substantially continuous fibers, staple fibers, filaments, fibrils, and combinations thereof.

The fibers of the elastomeric nonwoven web (including elastomeric fibers and, optionally, one or more non-elastomeric fibers) can be in any arrangement. Generally, the fibers are provided in a random, nonwoven arrangement. Although the present disclosure focuses on nonwoven elastomeric webs, it is noted that the elastomer fibers described herein can also be used to manufacture traditional woven fabrics that can be used in place of, or in addition to, an elastomeric nonwoven web. The fibers within the elastomeric nonwoven web are typically arranged so as to provide a mean flow pore size in the range of about 0.2 micron to about 15 microns, about 0.2 micron to about 10 microns, or about 0.2 micron to about 5 microns. In some embodiments, the mean flow pore size is about 15 microns or less, about 10 microns or less, about 8 microns or less, or about 5 microns or less. A method for measuring mean flow pore size is set forth below in the Experimental section and in reference to FIGS. 6 and 7. A description of mean flow pore size measurement is also found in U.S. Patent Application Publication No. 2011/0198280 to Jones et al, which is incorporated by reference herein.

The means of producing the nonwoven elastomeric web can vary. In general, nonwoven webs are typically produced in three stages: web formation, bonding, and finishing treatments. Web formation can be accomplished by any means known in the art. For example, in certain embodiments, the web may be formed by a drylaid process, a spunlaid process, or a wetlaid process. In some embodiments, the elastomeric nonwoven web is made by meltblowing or spunbonding processes.

Meltblowing is a process wherein a polymer (or polymers) is melted to a liquid state and extruded through a linear die containing numerous (e.g., several hundred or more) small orifices. As the polymer is extruded, streams of hot air are rapidly blown at the polymer, rapidly stretching and/or attenuating the extruded polymer streams to form extremely fine filaments. The air streams typically stretch or attenuate the molten polymer by many orders of magnitude. The stretched polymer fibers are collected as a randomly entangled, self-bonded nonwoven web. Meltblowing generally is described, for example, in U.S. Pat. No. 3,849,241 to Butin, which is incorporated herein by reference.

SEM images of an exemplary meltblown elastomeric nonwoven web are shown in FIGS. 5A and 5B at two magnifications. This web comprises a polypropylene-based elastomer (meltblown at the Partner's Lab in The Nonwovens Institute located in North Carolina State University). The meltblown fibers were self-bonded together to form the web. As can be seen in the SEM images of FIGS. 5A and 5B, this particular nonwoven elastomeric web comprises fibers with a relatively large fiber size distribution, which form pores having a large pore size distribution.

Meltblowing is generally capable of providing fibers with relatively small diameters. Diameter and other properties of meltblown fibers can be tailored by modifying various process parameters (e.g., die design, polymer throughput, air characteristics, collector placement, and web handling). Attenuating the air pressure affects fiber size, as higher pressures typically yield finer fibers (e.g., up to about 5 microns, such as about 1-5 microns) and lower pressures yield coarser fibers (e.g., up to about 20 microns, such as about 20-50 microns). In certain embodiments of the present invention, the elastomeric nonwoven web comprises meltblown fibers having average diameters in the range of about 1 to about 10, e.g., about 2 to about 5 microns. In some embodiments, the mean flow pore size of a meltblown elastomeric nonwoven web can be about 20 microns or less, about 10 microns or less, about 8 microns or less, about 5 microns or less, about 2 microns or less, or about 1 micron or less.

Spunbonding can employ various types of fiber spinning process (e.g., wet, dry, melt, or emulsion). Melt spinning is most commonly used, wherein a polymer is melted to a liquid state and forced through small orifices into cool air, such that the polymer strands solidify according to the shape of the orifices. The fiber bundles thus produced are then drawn, i.e., mechanically stretched (e.g., by a factor of 3-5) to orient the fibers. A nonwoven web is then formed by depositing the drawn fibers onto a moving belt. General spunbonding processes are described, for example, in U.S.

Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, and U.S. Pat. No. 3,542,615 to Dobo et al., which are all incorporated herein by reference. Spunbonding typically produces a larger diameter filament. For example, in some embodiments, spunbonding produces fibers having an average diameter of about 20 microns or more.

Various methods are available for processing multicomponent fibers to obtain fibers having smaller diameters (e.g., less than about 5 microns, less than about 2 microns, less than about 1 micron, less than about 0.5 microns, or even less). Consequently, nonwoven webs having smaller mean flow pore sizes can be produced. Although these methods are commonly applied to spunbonded materials, which typically have larger diameters, it is noted that they can also be applied to meltblown materials as well as fibrous materials prepared by other means. For example, in some embodiments, splittable multicomponent fibers are produced (e.g., including but not limited to, segmented pie, ribbon, islands in the sea, or multilobal) and subsequently split or fibrillated to provide two or more fibers having smaller diameters. The means by which such fibers can be split can vary and can include various processes that impart mechanical energy to the fibers, such as hydroentangling. Exemplary methods for this process are described, for example, in U.S. Pat. No. 7,981,226 to Pourdeyhimi et al., which is incorporated herein by reference.

In some embodiments, multicomponent fibers are produced and subsequently treated (e.g., by contacting the fibers with a solvent) to remove one or more of the components. For example, in certain embodiments, an islands-in-the-sea fiber can be produced and treated to dissolve the sea component, leaving the islands as fibers with smaller diameters. Exemplary methods for this type of process are described, for example, in U.S. Pat. No. 4,612,228 to Kato et al., which is incorporated herein by reference.

After production of the fibers and deposition of the fibers onto a surface, the nonwoven web can, in some embodiments, be subjected to some type of bonding (including, but not limited to, thermal fusion or bonding, mechanical entanglement, chemical adhesive, or a combination thereof), although in some embodiments, the web preparation process itself provides the necessary bonding and no further treatment is used. In one embodiment, the nonwoven web is bonded thermally using a calendar or a thru-air oven. In other embodiments, the nonwoven web is subjected to hydroentangling, which is a mechanism used to entangle and bond fibers using hydrodynamic forces. For example, the fibers can be hydroentangled by exposing the nonwoven web to water pressure from one or more hydroentangling manifolds at a water pressure in the range of about 10 bar to about 1000 bar. In some embodiments, needle punching is utilized, wherein needles are used to provide physical entanglement between fibers.

Selection of the bonding technique (or techniques) can in some embodiments be dictated by the ultimate application of the nonwoven elastomeric web. For example, if the nonwoven web is to be used for filtering large particles, it can in some embodiments be made using spunbonded fibers that are randomly interlocked. If the nonwoven fabric is needed to filter smaller particles, then it can in some embodiments be made from meltblown fibers, which are typically bonded during the meltblowing process.

The fibrous webs thus produced can have varying thicknesses. The process parameters can be modified to vary the thickness. For example, in some embodiments, increasing the speed of the moving belt onto which fibers are deposited results in a thinner web. Average thicknesses of the nonwoven elastomeric webs can vary and in some embodiments, the web may have an average thickness of about 1 mm or less. In one embodiment, the basis weight of the elastomeric nonwoven web is about 500 g/m$^2$ or less, about 400 g/m$^2$ or less, about 300 g/m$^2$ or less, about 200 g/m$^2$ or less, about 100 g/m$^2$ or less, or about 50 g/m$^2$ or less. As used herein, the basis weight of a web refers to the mass of fibrous material per unit area, which can be measured according to ASTM D3776.

As an alternative means for nonwoven elastomeric web formation, fibers can be extruded, crimped, and cut into staple fibers from which a web can be formed and then bonded by one or more of the methods described above. In some embodiments, staple or filament fibers can be used to form woven, knitted or braided structures as well. In another embodiment of the present invention, staple nonwoven fabrics can be constructed by spinning fibers, cutting them into short segments, and assembling them into bales. The bales can then be spread in a uniform web by a wetlaid process, airlaid process, or carding process and bonded as described above.

Figure 6:
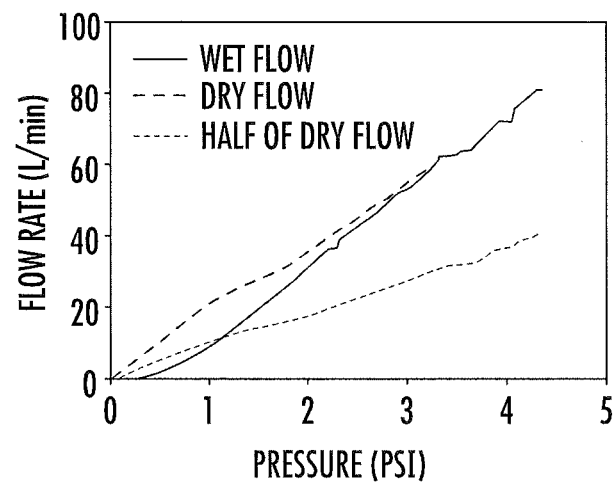
FIG. 6 is a plot of pressure versus flow rate for an exemplary elastomeric filter according to the present invention, with data obtained from the mean flow pore measurement.
Figure 7:
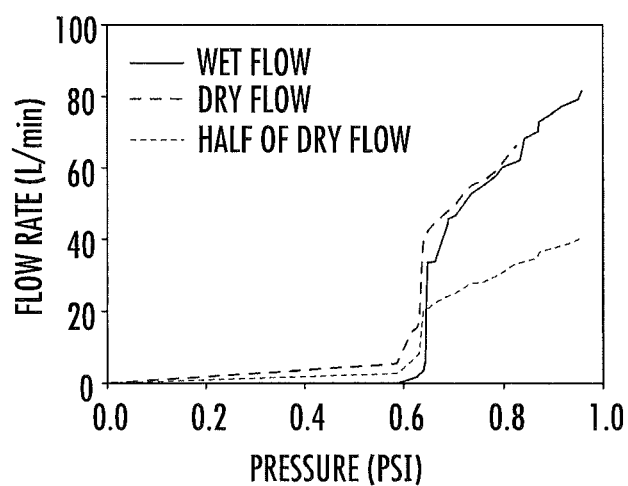
FIG. 7 is a comparative plot of pressure versus flow rate for an exemplary conventional woven filter medium, with data obtained from mean flow pore measurement.

FIG. 6 provides exemplary wet-up/dry-up curves of an elastomeric meltblown web useful in the present invention and FIG. 7 provides exemplary wet-up/dry-up curves for a comparative prior art conventional woven fabric (such as shown in FIGS. 1A and 1B). The wet-up/dry-up curves are based on data obtained using a capillary flow porometer and provide information regarding mean flow pore size. A wetting liquid (here, Galwick, having a surface tension of 15.9 Dynes/cm) is applied to the filter material and allowed to fill the pores. A nonreactive gas or air is then passed through the material and allowed to displace the liquid from the pores. The gas pressure and flow rates through wet and dry samples are measured and plotted and a "half dry-up" curve is drawn based on the dry-up curve (by dividing each data point on the dry-up curve by two).

The mean flow pore diameter is the diameter calculated at the mean flow pressure, which is the point at which the wet curve meets with the half dry-up curve. The mean flow pore diameter can be calculated based on the equation $D=(4\gamma \cos \theta)/p$, wherein D is pore diameter, $\gamma$ is surface tension of the liquid, $\theta$ is the contact angle of the liquid, and p is differential gas pressure.

As shown in FIG. 6, the elastomeric meltblown nonwoven web exhibited a mean flow pressure of about 1 PSI, at a flow rate of roughly 10 L/min. The meltblown material tested comprises a layered fiber structure and relatively large fiber diameter distribution and consequently, the nonwoven elastomeric web has a large pore size distribution. In contrast, as shown in FIG. 7, the woven filter medium exhibited a mean flow pressure of about 0.65 PSI, at a flow rate of roughly 20 L/min. The woven filter media generally has a narrow pore size distribution. As can be seen, there are differences between the flow characteristics of a typical elastomeric nonwoven web used in the present invention and a conventional woven filter structure. The elastomeric nonwoven web provides a more gradual increase in flow rate as pressure increases, whereas the woven structure exhibits virtually no flow until a certain pressure is reached.

The one or more structural support layers used to strengthen the elastomeric nonwoven web can be any type of material sufficient to strengthen the web. Preferably, the structural support layer comprises a dimensionally stable substrate. It can, in certain embodiments, comprise a mesh, woven web (e.g., scrim or gauze), or nonwoven web. Where two or more structural support layers are associated with the nonwoven elastomeric web, the multiple structural support layers are preferably on either side of the nonwoven web, such that these structural support layers effectively sandwich the elastomeric web therebetween. Where two or more structural support layers are used, they may be the same type or different types of structural supports (e.g., in terms of chemical composition, mean flow pore size, fiber diameter, etc.).

The composition of the structural support layer(s) can vary and the structural support layer(s) can comprise, for example, one or more polymers, metals (e.g., wire), ceramics, or natural materials (e.g., natural fibers). Where the structural support layer comprises fibers, the fibers can have average diameters, for example, in the range of from about 20 microns to about 100 microns, although fibers having larger and smaller diameters are not intended to be excluded. In some embodiments, the average diameter of the fibers comprising the structural support layer is greater than the average diameter of the fibers comprising the nonwoven elastomeric web. Certain exemplary materials that can be used include, but are not limited to, large fiber nonwoven materials, e.g., those available from Freudenberg, Colbond, Johns Manville, Fiberweb, and others. In particular, in certain embodiments, Reemay® (from Fiberweb), Lutradur® (from Freudenberg), or Colback® (from Colbond) are used as structural support layers.

In some embodiments, it is advantageous for the structural support layer to have a mean flow pore size that is greater than that of the elastomeric nonwoven web. This is true particularly where the elastomeric web and structural support layer are configured such that, during filtration, the material to be filtered comes into contact with a structural support layer first, prior to coming into contact with the elastomeric nonwoven web. In such embodiments, the structural support layer can act as a surface filter, screening out particulates prior to reaching the elastomeric nonwoven web filter component. For example, in certain embodiments, the structural support layer can have a mean flow pore size of about 5 to about 50 microns, e.g., about 10 to about 30 microns.

In certain embodiments, two structural support layers are provided, wherein the structural support layers are on the external surfaces of the nonwoven elastomeric web (i.e., wherein the structural support layers effectively sandwich the nonwoven elastomeric web. In some such embodiments, both the first and second structural support layers can have different constructions or can be similar (e.g., wherein both the first and structural support layers comprise a woven/mesh configuration). Preferably, the mean flow pore size of the second structural support layer (i.e., the support layer through which the material to be filtered passes last, i.e., the downstream portion during use of the filter) is less than the mean flow pore size of the first structural support layer (i.e., the support layer through which the material to be filter passes first, i.e., prior to contacting the nonwoven elastomeric web). By providing a second structural support layer having a smaller mean flow pore size than that of the first structural support layer, the nonwoven elastomeric web can, in some embodiments, be prevented from elongating and expanding the pore sizes within the elastomeric web during use in filtration, disadvantageously releasing the retained particulates.

The elastomeric nonwoven webs and one or more structural support layers can be combined or attached by any method known in the art. The elastomeric web and the one or more support layers are attached such that the layers together form a multi-layer construct that can be used as a unitary filtration structure. The components are advantageously laminated to provide a composite material. For example, in certain embodiments, the components can be connected via stitching, chemical bonding, thermal bonding (e.g., through air bonding or point bonding/calendering), ultrasonic bonding, print adhesive bonding, pressure (e.g., using a gravure roll), hydroentangling, or a combination thereof The bonding or attachment can also be accomplished by merely combining the two (or more) sheet materials in a frame, such as the frame illustrated in FIG. 10. The elastomeric nonwoven web and structural support layer can be combined by depositing one layer directly upon another layer and performing lamination (or other type of attachment). Alternatively, the layers can be separately prepared, combined, and laminated (or attached) together. Typically, the elastomeric nonwoven web is unstretched during the lamination process (i.e., the web is not subjected to any additional stretching force beyond that normally provided by any mechanism used to produce the laminate). Preferably the layers are attached or bonded together sparsely, maintaining some degree of movement for the elastomeric component.

Although the invention, as described herein, focuses on embodiments wherein one elastomeric nonwoven web is combined with one or more structural support layers, it is noted that, in some embodiments, the structure can comprise one or more additional layers. For example, in certain embodiments, more than one elastomeric nonwoven web (wherein the elastomeric webs may be the same or different) can be laminated to one another and one or both elastomeric nonwoven webs are further attached to one or more structural support layers. Use of a combination of multiple elastomeric nonwoven webs can be a convenient method of adjusting the filtration characteristics of the resulting filtration medium to a desired value, such as a desired mean flow pore size. As such, both embodiments comprising a single nonwoven elastomeric web and embodiments comprising more than one nonwoven elastomeric web are encompassed by the present disclosure. In some embodiments, laminating two or more nonwoven elastomeric webs together provides a means for decreasing the effective pore size of the resulting filter medium.

In certain embodiments, the structure comprising the one or more nonwoven elastomeric webs and the one or more structural support layers can function as a filter for any type of fluid (e.g., air or liquid). In certain embodiments, these structures are useful as filters for the removal of particulate matter from liquids (e.g., for treatment/clarification of water, such as wastewater).

Figure 8:
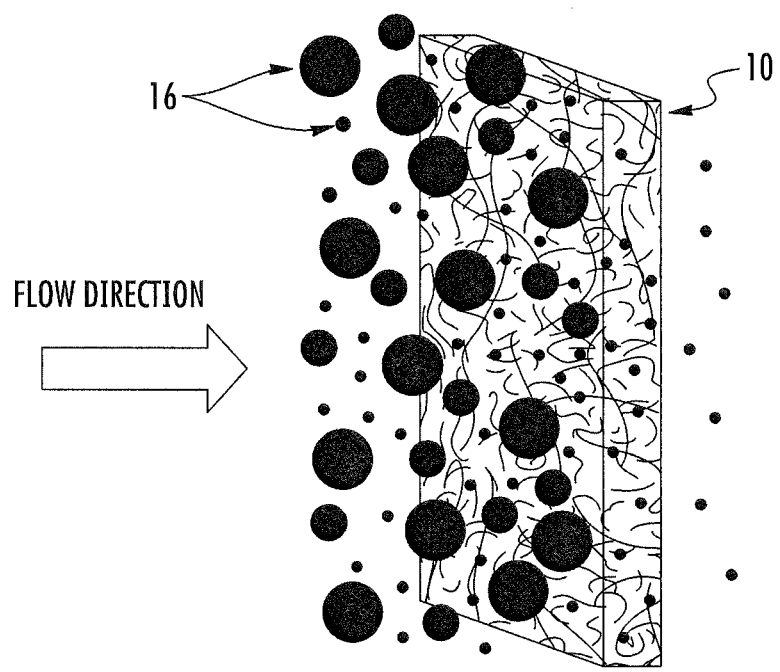
FIG. 8 is an illustration of an elastomeric nonwoven filter medium according to the present invention effectively filtering particles coming into contact with the filter medium.

FIG. 8 is a schematic illustrating the nonwoven elastomeric web 10, acting as a depth filter, capturing particles 16. Although this figure shows only the nonwoven elastomeric web, it is understood that, according to the invention, the web is typically provided in combination with one or more structural support layers as described herein. As shown, the non-woven filter medium can retain not only large particles, but small particles. In certain embodiments, large particles can be retained on the surface of the elastomeric web due to the size difference between certain particles and the pore size of the elastomeric web. In embodiments wherein the structure is positioned such that the material to be filtered first comes into contact with a structural support layer, some particles may be retained by the structural support layer and may thus not pass through to the elastomeric web. Again, the retention of particles depends on the diameter of the particulate matter as compared with the pore size of the structural support layer. Meanwhile, as shown, smaller particles may be able to penetrate through the elastomeric nonwoven web to some degree. Some particles are captured by depth filtration mechanisms due to the tortuous paths established within the elastomeric nonwoven web. In certain embodiments, the filter media described herein, used alone or in combination with other types of filters, are capable of providing filtered water that meets or exceeds the EPA and/or ANSI/NSF drinking water standards.

Advantageously, the materials described herein can be effectively cleaned and reused. During use in filtration, the flow resistance through the filter medium will increase with the number of particles deposited on or within the filter medium. Accordingly, the water volume capable of being treated by the filter medium decreases significantly with the retention of particles on or within the filter medium. Thus, it is beneficial to periodically clean the filter for continued use. The elastomeric nature of the elastomeric nonwoven web allows the web to withstand pressure that is sufficient to wash at least a substantial portion of the retained particulate matter out of the web. The backwashing process can, in some embodiments, comprise removing the filter from the filtration flow and passing pressurized water backwards (i.e., in the opposite direction of the filtration flow) through the filter. The backwashing process may, in some embodiments, be used in conjunction with a surface washing step to ensure removal of particulate matter from both the surface of the web or structural support layer and from the inner material of the web.

Due to the elastomeric nature of the nonwoven web, the web stretches significantly before breaking and thus is not permanently deformed by the pressure required to backwash the depth filter and remove the particulates retained therein. The pore dimensions within the elastomeric nonwoven web thus increase during the backwashing, allowing the water to effectively wash out particles contained therein. In certain embodiments, the structural support layer or layers help to protect the elastomeric nonwoven web and limit the extension of the web to some degree (i.e., by restricting the deformation of the elastomeric fibers), helping to ensure that the web does not break due to the pressure of the backwashing process. The absolute pressure the filter is capable of enduring will depend on the specific chemical makeup and physical structure of the nonwoven web and the one or more structural supports associated therewith.

Figure 9:
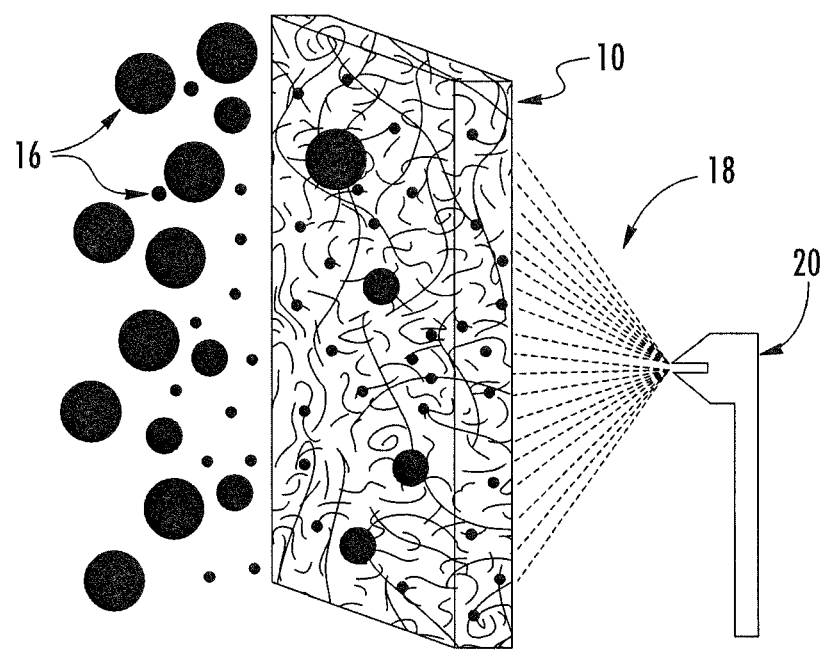
FIG. 9 is an illustration of an elastomeric nonwoven filter medium according to the present invention being backwashed to remove retained particles.

FIG. 9 is a schematic illustrating an exemplary backwashing process, wherein the nonwoven web 10 is backwashed by a high-pressure water jet 18 generated by a nozzle 20. The backwashing process is generally regenerates the filter medium (i.e., the nonwoven elastomeric web) 10 by removing particles 16, including larger particles deposited on the surface of the nonwoven web or on the structural support (not shown) and smaller particles retained within the filter medium. Depending on the desired water quality and the characteristics of filter media, the backwashing process is generally conducted so as to recover the filter's initial water permeability at initial applied pressure drop.

Figure 10:
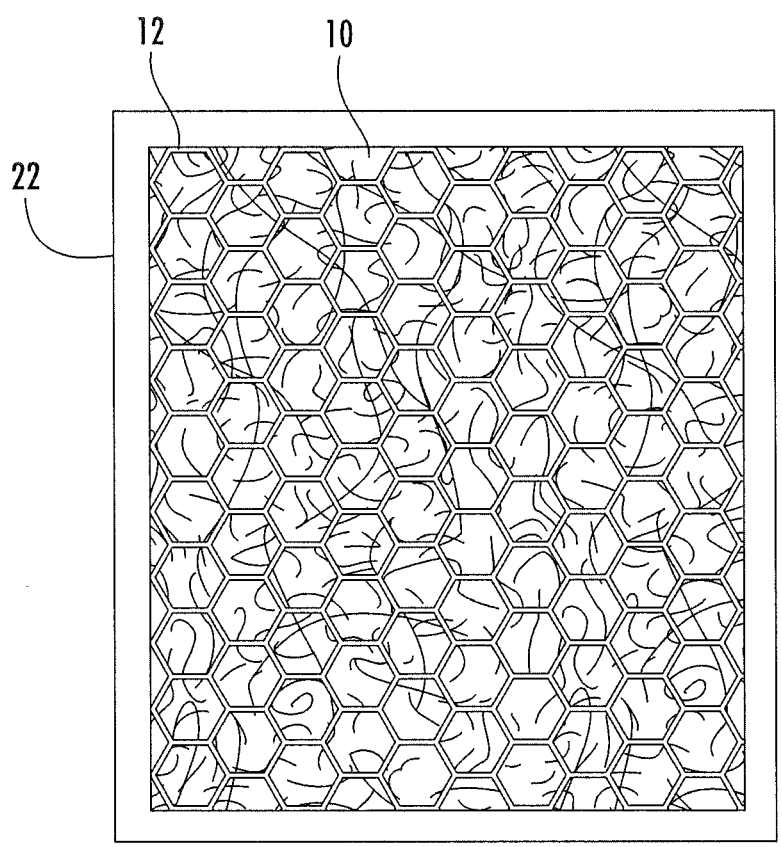
FIG. 10 is a filter according to the present invention, comprising an elastomeric nonwoven web and a structural support layer, supported within a frame.

In certain embodiments, the filter medium (i.e., nonwoven elastomeric web and one or more structural support layers) is incorporated within some type of housing. The type of housing can vary; in certain embodiments, the filter may be contained within a frame-type housing such as shown in FIG. 10. This schematic is not intended to be limiting; a filter material can be incorporated in any type of housing in any type of fashion. For example, the filter material can be incorporated within a frame-type housing of varying sizes and shapes (e.g., circular, square, rectangular, etc.). In some embodiments, the filter can be used in planar (i.e., flat) form, but may alternatively be used in rolled, spirally wound, or pleated form. In some embodiments, the filter can be incorporated within a cartridge or within a rotary disk filter. The filter can be used on a small-scale or large scale, e.g., in a portable water filter, faucet water filter, whole-house water filter, or in a water treatment plant. The filter can be used under gravity flow, vacuum flow, or pressurized flow conditions. Exemplary filter designs into which the presently described materials can be incorporated include, but are not limited to, the types of filters described in U.S. Pat. No. 7,972,508 to Danielsson et al. and U.S. Pat. No. 7,695,624 to Brockmann et al. and U.S. Patent Application Publication No. 2011/0180487 to Manic et al., which are incorporated herein by reference.

In some embodiments, the filtration medium described herein can be used in combination with one or more additional filter media. For example, two or more structures as described herein can be employed in-line. In some embodiments, other types of filters can be used with the structure described herein, e.g., to remove additional impurities from the liquid to be filtered. For example, in a water treatment plant, water is generally first passed through one or more screen filters to remove large debris. In some embodiments, the water may be treated prior to or after being brought into contact with the filter media described herein, e.g., to adjust the pH, to add chemicals to promote coagulation/flocculation of various contaminants, to disinfect the water, to soften the water, and/or to allow for sedimentation.

EXPERIMENTAL

Aspects of the present invention are more fully illustrated by the following example, which is set forth to illustrate certain aspects of the present invention and is not to be construed as limiting thereof.

Vistamaxx™ 2330 (ExxonMobil Chemical Company, Houston, Tex.), which is a propylene-based elastomer with a 290 melt flow rate (MFR), was meltblown to form fibers (at The Nonwovens Institute, North Carolina State University, Raleigh, N.C.). To form the fibers, the die and extruder temperature was 420° F. and the die-to-collector distance (DCD) was 7 inches. The polymer throughput was 0.3 and 0.6 g/hole/min and the basis weight of the web was controlled by the belt speed. The basis weight of the elastic meltblown webs thus produced was in the range of between 20 and 300 $g/m^2$, with fibers in the range of about 1 to about 10 microns in diameter (average of about 3 microns).

These elastomeric meltblown webs were evaluated for their mean flow pore size and water permeability at different basis weights of 60, 200, and 300 $g/m^2$. The mean flow pore size of each web was measured using a capillary flow porometer (available from Porous Materials, Inc., Ithaca, N.Y.) with a wet-up/dry-up testing mode. Galwick was used as the wetting fluid, with a surface tension of 15.9 dyne/cm. The general procedure for mean flow pore measurements using capillary flow porometry is described in, for example, Jena and Gupta, "Use of multiple test techniques for Evaluation of Complex Pore Structure," available at http://www.pmiapp.com/publications/docs/Use_of_Multiple_2002.pdf#page=3, and Jena and Gupta, "Characterization of Pore Structure of Filtration Media," available at http://www.pmiapp.com/publications/docs/Characterization_of_pore_2002.pdf, which are incorporated herein by reference.

As described briefly above, increasing pressure is applied to a wetted filter medium, causing the pores to open (eventually giving a dry sample). The flow rate through the wetted filter medium is plotted versus the applied pressure, giving a wet-up curve. A second run is then conducted on the dry filter medium with the same parameters, giving a dry-up curve, which can be plotted with the wet-up curve. A half dry-up curve can be calculated by dividing the data points from the dry-up curve by two, and mean flow pore size is calculated at the pressure where the wet-up curve and the half dry-up curve intersect, using the equation D=(4 γ cos θ)/p, wherein D is pore diameter, γ is surface tension of the liquid, θ is the contact angle of the liquid, and p is differential gas pressure.

The water permeability of these elastomeric meltblown webs was measured by a dead-end filter tester. In a dead-end filtration technique, one influent (i.e., feed fluid) is brought into contact with the filter medium and all particles suspended in the influent feed stream that are larger than the pore size of the filter medium are retained at its surface. The flow of influent through the filter medium can be measured and used to calculate permeability. A general procedure used for this type of measurement is found in the United States Environmental Protection Agency's Membrane Filtration Guidance Manual, available at http://www.epa.gov/ogwdw/disinfection/lt2/pdfs/guide_lt2_membranefiltration_final.pdf, which is incorporated herein by reference. In this test, the effective web area was 13.3 cm$^2$. Nitrogen gas was used to apply the pressure on the web and distilled water was used at room temperature. The water flow through the sample was recorded continuously by a computer and water permeability was calculated as the amount of water passed through the web at the specific testing time under the applied pressure. The mean flow pore sizes of the exemplary meltblown propylene-based webs are shown in Table 1.

TABLE 1

Pore size and water permeability of elastic meltblown webs

| Basis weight (g/m$^2$) | Mean flow pore size (micron) | Water permeability (m/h/250 mm H$_2$O) |
|---|---|---|
| 60 | 11.7 | 70.0 |
| 200 | 8.2 | 33.1 |
| 300 | 7.4 | 10.4 |

To evaluate the effect on pore size and water permeability, two layers of meltblown webs were laminated together. The layers were laminated at a roller temperature of 110° C., 2 bar of applied pressure between a roller and a belt, and 10 m/min of belt speed. The web combinations and their pore sizes and water permeabilities are shown in Table 2.

TABLE 2

Pore size and water permeability of laminated elastic meltblown webs

| Web combination | Mean flow pore size (micron) | Water permeability (m/h/250 mm H$_2$O) |
|---|---|---|
| 20 & 40 g/m$^2$ (total 60 g/m$^2$) | 9.3 | 13.2 |
| 30 & 50 g/m$^2$ (total 80 g/m$^2$) | 7.8 | 26.9 |
| 40 & 60 g/m$^2$ (total 100 g/m$^2$) | 7.7 | 23.4 |

Figure 1:
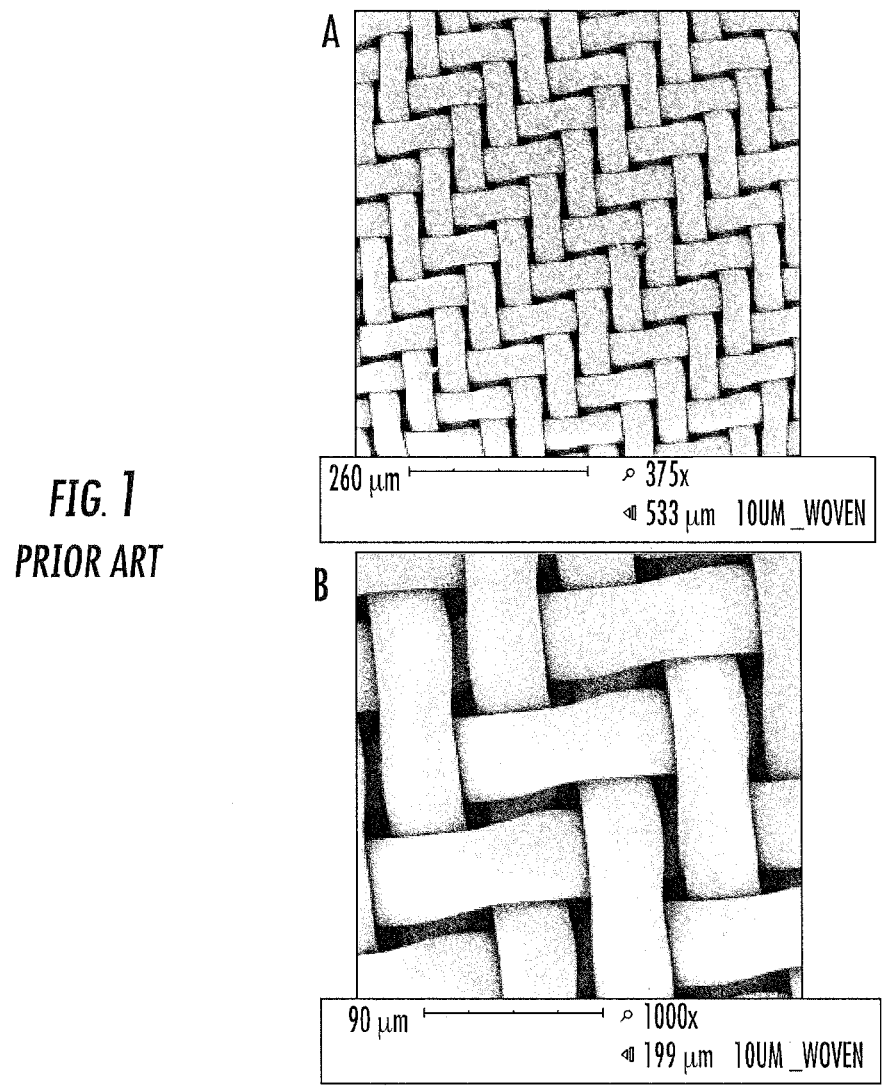
FIGS. 1A and 1B are scanning electron microscope (SEM) images of an exemplary conventional woven filter medium, e.g., as presently used in wastewater treatment, at two magnifications (A=375× magnification, B=1000× magnification)

Each filter (single-layer and 2-layer filters) was tested for filtration efficiency. The filters were laminated ultrasonically to a structural support layer (a 30 micron pore size PET woven fabric). The filter media were then contacted with a solution of 50 ppm polystyrene beads having an average diameter of 5 microns. The concentration of polystyrene beads in the solution was measured by a turbidimeter with a calibration curve relating particle concentration to turbidity. The solution was poured into the filter holder with 13.3 cm$^2$ of effective filter area in the dead-end filter tester and pressure was applied and controlled by an air cylinder at a pressure of 1 bar. Table 3 shows the filtration efficiency of the laminated filters as well as the filtration efficiency of a woven fabric with ten micron mean flow pore size (as shown in the SEM of FIG. 1) and the filtration efficiency of an elastomeric meltblown web as-received (i.e., not laminated to a structural support layer). The elastomeric meltblown webs show much higher filtration efficiency than current woven fabrics used in the wastewater treating equipment.

TABLE 3

Filtration efficiencies of filter media against 5 micron of polystyrene beads

| Filter medium | Filtration efficiency (%) |
|---|---|
| Comparative woven fabric (as shown in FIG. 1) | <30.0 |
| As-received 60 g/m$^2$ elastic meltblown web | 82.6 |
| 60 g/m$^2$ elastic meltblown web laminated to 30 micron PET woven fabric | 89.2 |
| 20 & 40 g/m$^2$ (total 60 g/m$^2$) elastic meltblown webs laminated to 30 micron PET woven fabric | >95.0 |
| 20 & 60 g/m$^2$ (total 80 g/m$^2$) elastic meltblown webs laminated to 30 micron PET woven fabric | >95.0 |
| 40 & 60 g/m$^2$ (total 100 g/m$^2$) elastic meltblown webs laminated to 30 micron PET woven fabric | >95.0 |

The 60 g/m$^2$ elastic meltblown web laminated to 30 micron PET woven fabric was subjected to 24 hours of treatment with 5 micron particles as described above. After backwashing, the web recovered to full original flow rate indicating that the backwashing was effective to regenerate the filtration capacity of the web.

What is claimed is:

1. A depth filter medium comprising:
   a first structural support layer comprising a first porous material;
   a second structural support layer comprising a second porous material;
   an elastomeric nonwoven web attached to the first structural support layer,
      wherein the elastomeric nonwoven web comprises elastomeric fibers and has a mean flow pore size of about 15 microns or less;
      wherein the elastomeric nonwoven web is meltblown;
      wherein the elastomeric nonwoven web comprises tortuous paths therethrough, allowing particulates to be retained within the web; and
      wherein the elastomeric fibers comprise a copolyester elastomer;
   wherein said first structural support layer has a mean flow pore size greater than the mean flow pore size of the elastomeric nonwoven web;
   wherein said second structural support layer has a mean flow pore size greater than the mean flow pore size of the elastomeric nonwoven web, said elastomeric nonwoven web being positioned between said first and second structural support layers; and wherein the second porous material has a mean flow pore size smaller than the mean flow pore size of the first porous material;

and further wherein the depth filter medium is a reusable depth filter medium adapted for removal of particulate matter from liquids and which is capable of withstanding backwashing to remove particulates from the depth filter medium for regeneration of filtration capacity of the depth filter medium.

2. The depth filter medium of claim 1, wherein the second structural layer is selected from a woven material or a mesh having a uniform pore size.

3. The depth filter medium of claim 1, wherein the mean flow pore size of the second structural support layer is about 30 microns or less.

4. The depth filter medium of claim 1, wherein the first structural support layer is selected from a woven material or a mesh having a uniform pore size.

5. The depth filter medium of claim 1, wherein the mean flow pore size of the first structural support layer is about 30 microns or less.

6. The depth filter medium of claim 1, wherein the elastomeric nonwoven web has a mean flow pore size of less than about 5 microns.

7. The depth filter medium of claim 1, wherein the elastomeric nonwoven web comprises two or more elastomeric nonwoven sheets laminated together.

8. The depth filter medium of claim 1, wherein the elastomeric nonwoven web has a basis weight of about 500 g/m² or less.

9. The depth filter medium of claim 8, wherein the elastomeric nonwoven web has a basis weight of about 200 g/m² or less.

10. The depth filter medium of claim 1, wherein the first structural support layer comprises a woven material or a mesh having a mean flow pore size of about 30 microns or less; and the elastomeric nonwoven web comprises a single layer of elastomeric nonwoven material or a laminate of multiple layers of elastomeric nonwoven material, the elastomeric nonwoven web having a mean flow pore size of about 10 microns or less and a basis weight of about 200 g/m² or less.

11. A depth filter comprising:
a depth filter medium comprising:
a first structural support layer comprising a first porous material;
a second structural support layer comprising a second porous material;
an elastomeric nonwoven web attached to the first structural support layer,
wherein the elastomeric nonwoven web comprises elastomeric fibers and has a mean flow pore size of about 15 microns or less;
wherein the elastomeric nonwoven web is meltblown;
wherein the elastomeric nonwoven web comprises tortuous paths therethrough, allowing particulates to be retained within the web; and
wherein the elastomeric fibers comprise a copolyester elastomer;
wherein said first structural support layer has a mean flow pore size greater than the mean flow pore size of the elastomeric nonwoven web;
wherein said second structural support layer has a mean flow pore size greater than the mean flow pore size of the elastomeric nonwoven web, said elastomeric nonwoven web being positioned between said first and second structural support layers; and
wherein the second porous material has a mean flow pore size smaller than the mean flow pore size of the first porous material;
and further wherein the depth filter medium is a reusable depth filter medium adapted for removal of particulate matter from liquids and which is capable of withstanding backwashing to remove particulates from the depth filter medium for regeneration of filtration capacity of the depth filter medium; and
a structural frame attached to the depth filter medium.

12. The depth filter of claim 11, wherein the depth filter is adapted for water filtration.

13. A method of making a depth filter medium, the depth filter medium comprising:
a first structural support layer comprising a first porous material;
a second structural support layer comprising a second porous material;
an elastomeric nonwoven web attached to the first structural support layer,
wherein the elastomeric nonwoven web comprises elastomeric fibers and has a mean flow pore size of about 15 microns or less;
wherein the elastomeric nonwoven web is meltblown;
wherein the elastomeric nonwoven web comprises tortuous paths therethrough, allowing particulates to be retained within the web; and
wherein the elastomeric fibers comprise a copolyester elastomer;
wherein said first structural support layer has a mean flow pore size greater than the mean flow pore size of the elastomeric nonwoven web;
wherein said second structural support layer has a mean flow pore size greater than the mean flow pore size of the elastomeric nonwoven web, said elastomeric nonwoven web being positioned between said first and second structural support layers;
wherein the second porous material has a mean flow pore size smaller than the mean flow pore size of the first porous material;
and further wherein the depth filter medium is a reusable depth filter medium adapted for removal of particulate matter from liquids and which is capable of withstanding backwashing to remove particulates from the depth filter medium for regeneration of filtration capacity of the depth filter medium,
the method of making the depth filter medium comprising:
providing the elastomeric nonwoven web; and
attaching the elastomeric nonwoven web to the first support layer to form a depth filter medium.

14. The method of claim 13, wherein the providing step comprises meltblowing or spunbonding the elastomeric fibers.

15. The method of claim 13, wherein the attaching step comprises stitching, chemically bonding, thermally bonding, ultrasonic bonding, print adhesive bonding, applying pressure, hydroentangling, or a combination thereof.

16. The method of claim 13, further comprising attaching the second structural support layer to the elastomeric nonwoven web on a side opposite from the first structural support layer.

17. The method of claim 13, wherein the providing step comprises laminating two or more layers of elastomeric nonwoven material together to form the elastomeric nonwoven web.

18. The method of claim 13, further comprising attaching a structural frame to the depth filter medium.

19. A method of filtering a liquid to remove particulate matter therefrom comprising:
contacting a liquid comprising particulate matter with a depth filter medium of claim 1 to remove a portion of the particulate matter from the liquid by depth filtration or a combination of depth filtration and surface filtration the depth filter medium comprising:
a first structural support layer comprising a first porous material;
a second structural support layer comprising a second porous material;
an elastomeric nonwoven web attached to the first structural support layer,
wherein the elastomeric nonwoven web comprises elastomeric fibers and has a mean flow pore size of about 15 microns or less;
wherein the elastomeric nonwoven web is meltblown;
wherein the elastomeric nonwoven web comprises tortuous paths therethrough, allowing particulates to be retained within the web; and
wherein the elastomeric fibers comprise a copolyester elastomer;
wherein said first structural support layer has a mean flow pore size greater than the mean flow pore size of the elastomeric nonwoven web;
wherein said second structural support layer has a mean flow pore size greater than the mean flow pore size of the elastomeric nonwoven web, said elastomeric nonwoven web being positioned between said first and second structural support layers; and
wherein the second porous material has a mean flow pore size smaller than the mean flow pore size of the first porous material;
and further wherein the depth filter medium is a reusable depth filter medium adapted for removal of particulate matter from liquids and which is capable of withstanding backwashing to remove particulates from the depth filter medium for regeneration of filtration capacity of the depth filter medium.

20. The method of claim 19, further comprising backwashing the depth filter medium such that at least a portion of the particulate matter captured by the depth filter medium is removed from the depth filter medium, allowing for its reuse in filtration.

21. The method of claim 19,
wherein the liquid is contacted with the depth filter medium such that the first structural support layer is upstream and the second structural support layer is downstream during use.

22. The depth filter medium of claim 1, wherein the average elastomeric fiber diameter is in the range of about 1 to about 20 microns.

23. The depth filter medium of claim 1, wherein the average elastomeric fiber diameter is in the range of about 2 to about 8 microns.

24. The depth filter medium of claim 1, wherein the first structural support layer has a mean flow pore size of about 5 to about 50 microns.

25. A depth filter medium comprising:
a first structural support layer;
a second structural support layer comprising a second porous material;
an elastomeric nonwoven web attached to the first structural support layer and consisting of at least two meltblown layers, each meltblown layer consisting essentially of copolyester elastomer fibers, at least one meltblown layer having a mean flow pore size of about 15 microns or less;
wherein the elastomeric nonwoven web comprises tortuous paths therethrough, allowing particulates to be retained within the web;
wherein said first structural support layer has a mean flow pore size greater than the mean flow pore size of the elastomeric nonwoven web,
wherein said second structural support layer has a mean flow pore size greater than the mean flow pore size of the elastomeric nonwoven web, said elastomeric nonwoven web being positioned between said first and second structural support layers; and
wherein the second porous material has a mean flow pore size smaller than the mean flow pore size of the first porous material;
and further wherein the depth filter medium is a reusable depth filter medium adapted for removal of particulate matter from liquids and which is capable of withstanding backwashing to remove particulates from the depth filter medium for regeneration of filtration capacity of the depth filter medium.

* * * * *